Patented May 3, 1938

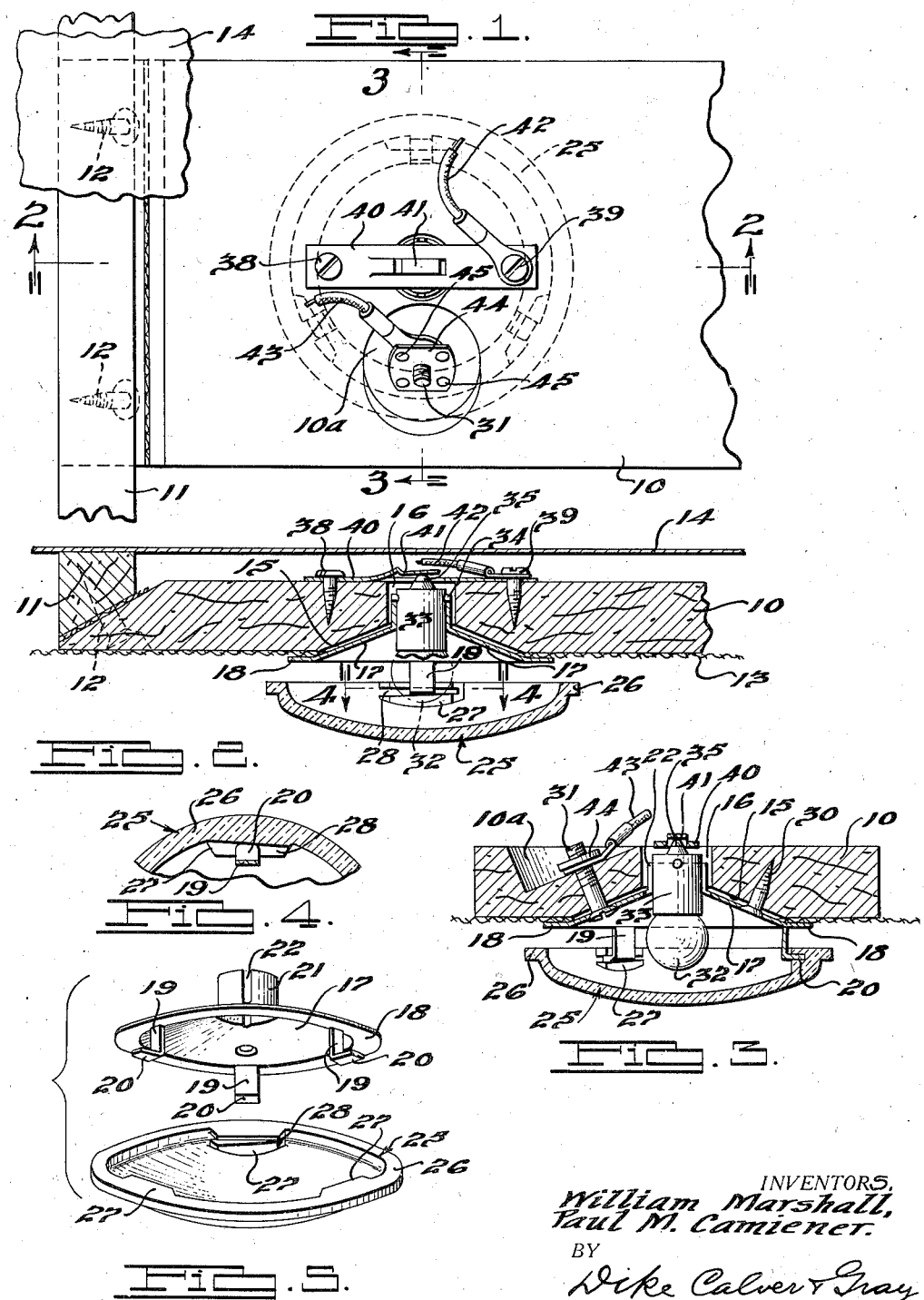

2,116,317

UNITED STATES PATENT OFFICE 2,116,317

DOME LIGHT ASSEMBLY

William Marshall and Paul M. Camiener, Detroit, Mich., assignors to Briggs Manufacturing Company, Detroit, Mich., a corporation of Michigan Application May 28, 1936, Serial No. 82,331

7 Claims. (Cl. 240—7.35)

This invention relates to dome light assemblies particularly adapted for use in vehicle bodies, such as automobile bodies, an object of the invention being to improve and simplify the construction of devices of this kind while at the same time providing an improved dome light assembly whereby more desirable lighting effects within the car may be secured.

Another object of the present invention is to provide an improved dome light assembly which is compact, inexpensive to manufacture and one which can be installed quickly and easily with a minimum of labor.

A further object of the invention is to provide a dome light structure for a vehicle body in which the metal reflector is of improved construction, having formed therein a centrally located socket for an electric lamp bulb and in which the wiring connections and contact members are carried by the supporting block or plate for the reflector and associated parts of the assembly.

Another object of the invention is to provide an improved dome light assembly in which one of the electrical connectors serves as means for removably attaching the reflector to the roof member.

The above and other objects of the invention will appear from the following description and appended claims when considered in connection with the accompanying drawing forming a part of this specification.

In said drawing:

Fig. 1 is a fragmentary top plan view illustrating a dome light assembly embodying the present invention.

Fig. 2 is a vertical longitudinal section taken substantially along the line 2—2 of Fig. 1, looking in the direction of the arrows.

Fig. 3 is a vertical transverse section taken substantially along the line 3—3 of Fig. 1, looking in the direction of the arrows.

Fig. 4 is a fragmentary horizontal section taken substantially along the line 4—4 of Fig. 2, looking in the direction of the arrows; and Fig. 5 is a perspective view of the reflector and dome or shield of the dome light assembly shown in disassembled relation.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, one embodiment of the present invention, the assembly therein shown comprising a suitable mounting or supporting block or member 10 formed of wood or other suitable material removably attached by means of screws 12 to the under-faces of a pair of spaced wood roof bows 11 (one bow only being shown), the heads of the screws being countersunk, as shown in Fig. 2. The assembled supporting structure, that is the block 10 and roof bows 11, are preferably covered and concealed by the usual cloth headlining 13 which provides the interior covering for the roof. The block 10 with the dome light mounted therein is preferably spaced from the roof panel 14 of the vehicle. The block 10 is preferably provided in its under-face with a substantially frusto-conical socket or recess 15 which merges into a centrally disposed hole or opening 16 extending through to the outer or top face of the block.

The body of the dome light assembly comprises, as shown, a reflector or casing 17 formed of sheet metal and preferably chromium plated. The reflector has an outwardly directed flanged rim 18 which is cut away preferably at three spaced points to provide depending legs or members 19 having outwardly turned portions or feet 20. The metal of the reflector, at its apex, is extended upwardly to provide a centrally disposed sleeve or socket portion 21 provided with upright diametrically opposed slots or cut out portions 22. The legs 19 are adapted to engage and support a globe or translucent shield shown as a whole at 25, the inner periphery of the rim 26 of the shield being provided with integral spaced lugs or projections 27, three such being shown. The shield 25 is preferably formed of some non-breakable material, such for example, as "Tenite", although ground glass or other material may be used, and the segmental lugs or bosses 27 are molded or cast integrally from the material of the shield. The lugs are provided with wedge-shaped slots or under-cut grooves 28 which are adapted to cooperate with and receive the feet 20 of the leg members 19, see particularly Figs. 4 and 5. As shown in Fig. 4, each slot or under-cut groove 28 is wedge-shaped or tapers from its entrance end at the left to the right hand end thereof, this taper extending in two planes, namely in a horizontal plane from the inner face of the lug to the rim 26 and also in a substantially right angular plane through the height of the lug, this last named taper extending likewise from the left edge of the lug to the right edge thereof. The purpose of providing the lugs with the dual taper or compound wedge-like form is to cause the feet 20 of the supporting legs to bind in the slots 28 when the globe 25 is applied to the supporting legs and rotated or turned in a clockwise direction relative to the feet 20.

As seen in Fig. 3 the reflector or casing 17 is preferably held in place within the socket 15 by means of a wood screw 30 and a bolt 31, the bolt 31 serving the dual purpose of supporting the reflector and providing a terminal post for one of the electric contacts, as hereinafter described. The end of the bolt or cap screw 31 projects into a recess 10a formed in the outer or top face of the block 10.

The reflector 17 houses a source of light. The socket portion 22 thereof receives and supports the cylindrical base 33 of a conventional lamp bulb 32. The usual locating pins or studs 34 of the lamp base are inserted in the lower ends of the slits 22 and the bulb pushed upwardly until the pins 34 have passed through the slits, whereupon the bulb is turned in either direction until the pins engage over the upper edge or rim of the reflector socket 21, thus holding the bulb firmly in the socket.

As best seen in Figs. 1, 2 and 3 an electrical contact plate 40 is applied to the outer or top face of the block 10 and overlies the hole or opening 16. The contact plate or strip is held in place by screws 38 and 39 and is provided with a spring-like tongue 41 which is adapted to frictionally engage the central contact or tip 35 of the lamp base 33. It will be noted that the terminal of the ground wire 42 is connected to the screw 39, this screw thus serving the dual purpose of maintaining the contact plate 40 in place and as a binding post for the wire or conduit 42. The terminal of the lead-in wire or conduit 43 is adapted to be engaged by the removable binding post or cap screw 31 and is held in position upon the mounting block by means of an internally threaded contact plate or metal retainer member 44 which, as best shown in Fig. 1, is preferably secured to the block 10 within the recess 10a by means of nails or tacks 45. As best seen in Fig. 3, the terminal on the lead-in or ground wire 43, being fixed in position by the securing plate 44, is electrically connected to the reflector 17 by the removable binding post 31. Thus the binding post or cap screw 31 serves the dual function of providing the ground connection for the reflector and of supporting the reflector in position within the block opening or recess.

From the foregoing it will be seen that by virtue of the present invention the dome light assembly consists of a reflector which can be made in a single stamping and a dome or shield member which is likewise made in one piece by casting or molding. The electrical contacts and wire terminals for the assembly are located at the back or outer side of the wood mounting block and are thus separate from and independent of the reflector and dome. Moreover, by virtue of this construction the block 10 with its attached terminals and contacts may be first secured to the interior of the vehicle roof; thereafter the reflector can be applied to the inner face of the block, the lamp bulb slipped into the reflector socket and the dome applied to the depending legs or supporting lugs of the reflector to complete the assembly. It will be seen that the dome light assembly including the globe 25, reflector 17 and lamp bulb 32 can be removed from the supporting member or block 10 without affecting or disturbing either of the fixed contacts to which the terminals of the positive and negative wires 42 and 43 are secured.

We claim:

1. A dome light assembly comprising a metal reflector having spaced depending supporting members formed from the metal of said reflector, a slotted sleeve portion integral with and disposed centrally of said reflector and providing a socket for a lamp bulb, and a globe having spaced integral lugs provided with wedge-shaped slots for receiving said supporting members to removably support said globe in spaced relation to said reflector.

2. A dome light assembly for a vehicle body comprising a metal reflector set into a correspondingly shaped recess formed in a roof member of the body, said reflector having a centrally disposed upwardly projecting socket portion located within an opening in the roof member, spaced depending legs formed from the metal of said reflector, an electric lamp located within the reflector socket, and a shield removably attached to and supported by said legs in spaced relation to said reflector and roof member, said shield having spaced wedge-shaped socket portions and said legs having end portions engaging said wedge-shaped sockets.

3. A dome light assembly comprising a supporting block attachable to the roof of a vehicle body, said block having an opening therein, a dome light reflector set into said opening, an electric lamp carried by said reflector, an electric conductor having a terminal member, a retainer member fastened to said supporting block for anchoring said terminal thereto, and a device for securing said reflector to the supporting member, said device being anchored to said retainer member and forming an electrical connection with the terminal.

4. A dome light assembly for the interior of a vehicle body, comprising a wood mounting block having an opening formed therein supported adjacent the roof of said body, fixed electrical contacts secured to the top face of said block, a dome light assembly having a reflector located in said block opening, and means for removably attaching said reflector to said block, one of said means detachably engaging one of said fixed contacts.

5. A dome light assembly for the interior of a vehicle body, comprising a wood mounting block supported adjacent the roof of said body, fixed electrical contacts secured to the top face of said block, a dome light assembly having a reflector attached to the bottom of said block, means for removably attaching said reflector to said block, one of said means detachably engaging one of said fixed contacts, and a globe removably attached to said reflector.

6. A dome light assembly for the interior of a vehicle body, comprising a wood mounting block supported adjacent the roof of said body, fixed electrical contacts secured to the top face of said block, a dome light assembly having a reflector provided with a socket portion attached to the bottom of said block, a lamp removably mounted in said socket and engaging one of said fixed contacts, and means for removably attaching said reflector to said block, one of said means comprising a binding post detachably engaging the other of said fixed contacts.

7. A dome light assembly for the interior of a vehicle body, comprising a wood mounting block supported adjacent the roof of said body, fixed electrical contacts secured to the top face of said block, a dome light assembly having a reflector provided with a socket portion attached to the bottom of said block, a lamp removably mounted in said socket and engaging one of said fixed contacts, means for removably attaching said reflector to said block, one of said means comprising a binding post detachably engaging the other of said fixed contacts, and a translucent shield detachably connected with said reflector.

WILLIAM MARSHALL.
PAUL M. CAMIENER.